United States Patent [19]

Kade et al.

[11] Patent Number: 5,511,859
[45] Date of Patent: Apr. 30, 1996

[54] REGENERATIVE AND FRICTION BRAKE BLEND CONTROL

[75] Inventors: Alexander Kade, Grosse Pointe Woods; Allen J. Walenty, Macomb; Kevin G. Leppek, Rochester Hills, all of Mich.

[73] Assignee: General Motors Corporation, Detroit, Mich.

[21] Appl. No.: 519,871

[22] Filed: Aug. 25, 1995

[51] Int. Cl.$^6$ .................................................. B60T 13/74
[52] U.S. Cl. ........................... 303/3; 188/156; 188/159; 188/181 T; 303/113.4; 303/152; 303/155; 303/112
[58] Field of Search ........................ 303/3, 152, 155, 303/113.4, 20, DIG. 3, DIG. 4, 112, 15, 20; 188/162, 156, 159, 158, 181 T; 366/426.01, 426.02, 426.03, 424.01; 180/165, 65.8, 65.1, 197; 318/371, 376, 372

[56] References Cited

U.S. PATENT DOCUMENTS

| | | | |
|---|---|---|---|
| 3,774,095 | 11/1973 | Coccia | 318/371 |
| 4,075,538 | 2/1978 | Plunkett | 318/52 |
| 4,750,125 | 6/1988 | Leppek et al. | 364/426 |
| 4,835,695 | 5/1989 | Walenty et al. | 364/426.02 |
| 4,916,619 | 4/4990 | Walenty et al. | 364/426.02 |
| 4,917,445 | 4/1990 | Leppek et al. | 303/100 |
| 4,941,553 | 7/1990 | Harrison | 188/156 |
| 4,962,969 | 10/1990 | Davis | 303/3 |

(List continued on next page.)

FOREIGN PATENT DOCUMENTS

| | | |
|---|---|---|
| 0170478 | 5/1985 | European Pat. Off. . |
| 0427138 | 2/1990 | European Pat. Off. . |
| 839764 | 1/1980 | U.S.S.R. . |

OTHER PUBLICATIONS

Brake Adjuster Algorithm, Research Disclosure No. 32411, Published Apr. 1991.
Brake Fade Compensation Technique, Research Disclosure No. 31961, Published Nov. 1990.
Surface Adaptive Torque Release, Research Disclosure No. 30762, Published Nov. 1989.
Slip Command Brake Apply System, Research Disclosure No. 31955, Published Nov. 1990.
Vehicle Reference Over–Speed Normalization, Research Disclosure No. 31359, Published May 1990.
Method to Compensate for Velocity Dependent Compliance Variation in Drum Brakes Research Disclosure No. 36801, Published Dec. 1994.
Adaptive Proportioning Fail–Safe, Research Disclosure No. 36621, Published Oct. 1994.
Adaptive Brake Proportioning, Research Disclosure No. 30755, Published Nov. 1989.
Apply Mode Only Logic, Research Disclosure No. 32385, Published Mar. 1991.

*Primary Examiner*—Douglas C. Butler
*Attorney, Agent, or Firm*—Anthony Luke Simon

[57] ABSTRACT

A regenerative and friction brake blend control method for use in a vehicle with at least one positionable hydraulic brake actuator for achieving friction braking and an electric propulsion motor with regenerative braking capability wherein an amount of regenerative braking achieved is indicated by a signal, wherein the method comprises the steps of determining a hydraulic actuator position command indicating a desired vehicle braking, determining responsive the hydraulic actuator position command a regenerative braking command, commanding the electric propulsion motor to regeneratively brake the vehicle responsive to the regenerative braking command, receiving the signal indicative of regenerative braking achieved, converting the signal indicative of regenerative braking achieved to an actuator position reduction signal, subtracting the actuator position reduction signal from the hydraulic actuator position command to determine a difference command, and commanding the hydraulic actuator according to the difference command, wherein the hydraulic actuator and the regenerative braking together achieve the desired vehicle braking.

2 Claims, 4 Drawing Sheets

U.S. PATENT DOCUMENTS

| | | | |
|---|---|---|---|
| 4,969,756 | 11/1990 | Vallec et al. | 388/815 |
| 5,000,297 | 3/1991 | Shaw et al. | 188/156 |
| 5,090,511 | 2/1992 | Kabasin | 180/197 |
| 5,148,883 | 9/1992 | Tanaka | 180/165 |
| 5,173,860 | 12/1992 | Walenty et al. | 364/426.03 |
| 5,215,156 | 6/1993 | Stubach et al. | 180/65.3 |
| 5,222,568 | 6/1993 | Higasa et al. | 180/65.5 |
| 5,234,262 | 8/1993 | Walenty | 303/111 |
| 5,263,743 | 11/1992 | Leppek et al. | 303/100 |
| 5,265,693 | 11/1993 | Rees et al. | 180/197 |
| 5,289,093 | 2/1994 | Jobard . | |
| 5,320,421 | 6/1994 | Kade et al. | 303/110 |
| 5,322,352 | 6/1994 | Ohno et al. | 303/3 |
| 5,365,431 | 11/1994 | Minezawa et al. | 364/424.01 |
| 5,378,053 | 1/1995 | Patient et al. | 303/3 |
| 5,390,992 | 2/1995 | Walenty et al. | 303/112 |

REGENERATIVE AND FRICTION BRAKE BLEND CONTROL

This invention relates to a regenerative and friction brake blend control method and apparatus.

BACKGROUND OF THE INVENTION

In many electric vehicles, energy that places the vehicle in motion is partially recovered during vehicle braking using what is known as regenerative braking. Regenerative braking is achieved during braking maneuvers by configuring the drive motor as a generator and storing or redistributing the power generated by the motor. The act of generating power creates a braking torque on the motor that is transmitted to the road wheels to slow the vehicle. In many situations, regenerative braking cannot accomplish all of the vehicle braking so regenerative braking is blended with hydraulic braking to achieve the total desired braking.

SUMMARY OF THE PRESENT INVENTION

A regenerative and friction brake blend control method according to this invention is characterized by the features specified in claim 1.

Advantageously, this invention provides a regenerative brake blending method that maximizes recovery of available regenerative energy. Advantageously, this invention enables maximum use of available regenerative energy during regenerative braking by reducing and/or eliminating hydraulic braking during a braking event as the regenerative braking capability increases.

Advantageously, this invention provides a regenerative and friction brake blending control method that blends position control of brake actuators with electric motor regenerative braking. Advantageously, in one example, this invention blends regenerative braking during normal brake events and during anti-lock brake events.

Advantageously, an example regenerative and friction brake blend control method according to this invention, for use in a vehicle with at least one positionable hydraulic brake actuator for achieving friction braking and an electric propulsion motor with regenerative braking capability wherein an amount of regenerative braking achieved is indicated by a signal, comprises the steps of determining a hydraulic actuator position command indicating a desired vehicle braking, determining responsive the hydraulic actuator position command a regenerative braking command, commanding the electric propulsion motor to regeneratively brake the vehicle responsive to the regenerative braking command, receiving the signal indicative of regenerative braking achieved, convening the signal indicative of regenerative braking achieved to an actuator position reduction signal, subtracting the actuator position reduction signal from the hydraulic actuator position command to determine a difference command, and commanding the hydraulic actuator according to the difference command, wherein the hydraulic actuator and the regenerative braking together achieve the desired vehicle braking.

BRIEF DESCRIPTION OF THE DRAWINGS

The present invention will now be described by way of example with reference to the accompanying drawings in which.

DETAILED DESCRIPTION OF THE INVENTION

Figure 1:
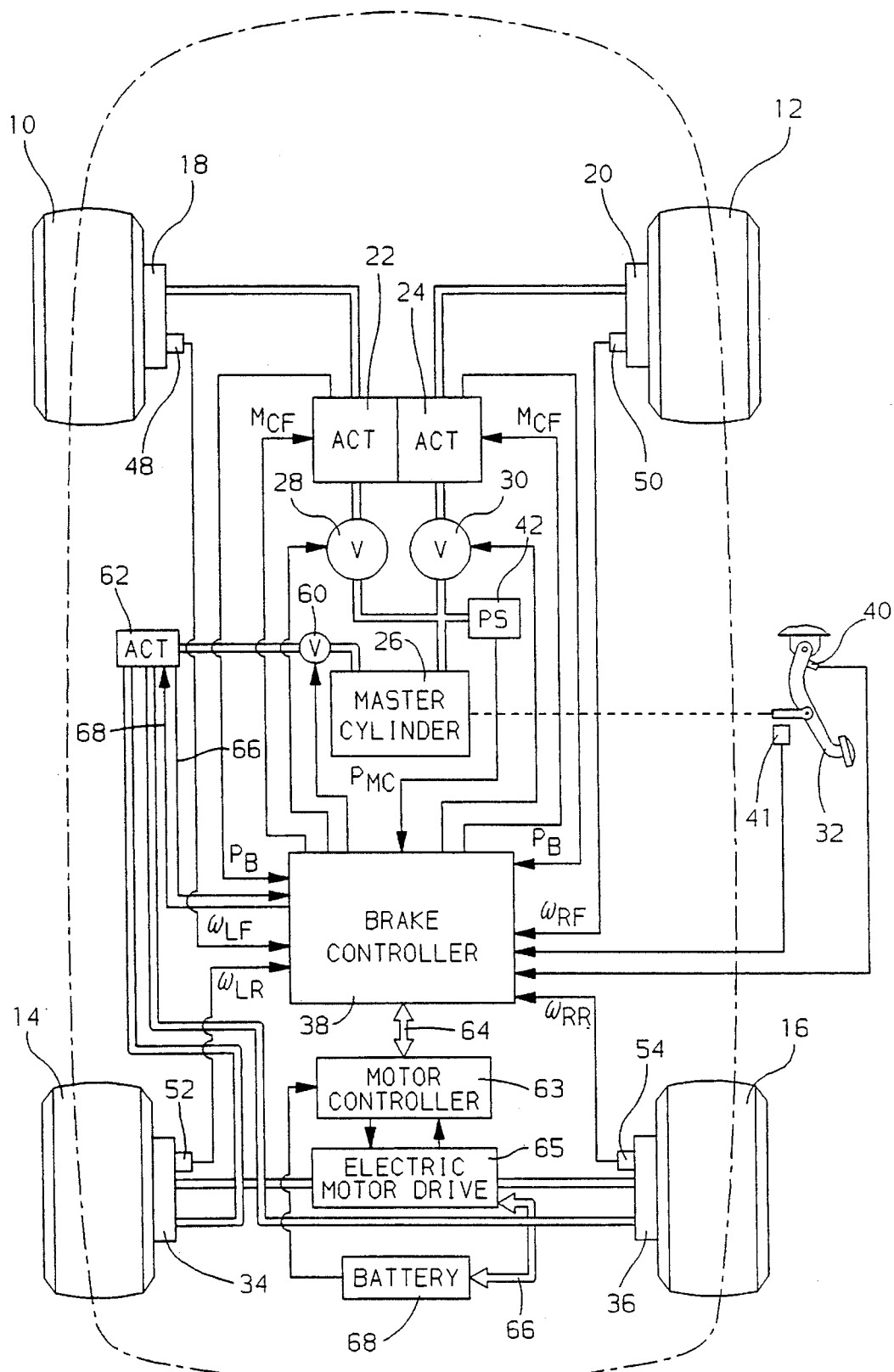
FIG. 1 illustrates a schematic vehicle with hydraulic and regenerative braking systems according to this invention.

Referring to FIG. 1, the example vehicle braking system illustrated includes left and right front wheels 10 and 12 and left and right rear wheels 14 and 16, driven by electric motor drive 61. In a hybrid vehicle example, the front wheels 10 and 12 may be driven by an internal combustion engine. The front and rear wheels 10, 12, 14 and 16 have respective hydraulic actuated brakes 18, 20, 34 and 36 actuated by hydraulic pressure generated via respective electrohydraulic actuators 22, 24 and 62 (for both rear brakes 34 and 36; in another example, each rear brake has a separate electrohydraulic actuator). Each of the hydraulic brakes 18, 20, 34 and 36 are further hydraulically coupled to a conventional master cylinder 26 through respective normally opened electromagnetic valves 28, 30 and 60. Actuators 22, 24, 60 include a working chamber hydraulically coupled to the wheel brakes 18, 20, 34 and 36 and the valves 28, 30 and 60. In the preferred form of the invention, the electrohydraulic actuators 22, 24 and 60 each take the form of a brushless dc motor driven actuator wherein a motor is operated to control a piston for regulating the braking pressure (the motor for actuator 60 drives two pistons in parallel, one for each rear brake 34, 36).

Friction brake torque is established at each brake 18, 20, 34, 36 at a value proportional to the position of each actuator piston and is reflected through the torque output of the respective motor. For example, the electrohydraulic brake actuators 22, 24, 62 may each take the general form of the electrohydraulic actuator as described in the U.S. Pat. No. RE 33,557, which issued Mar. 19, 1991, assigned to the assignee of this invention. As discussed below, the actuators 22, 24 and 62 may be operated using techniques described in U.S. patent application, Ser. No. 08/355,468, filed Dec. 14, 1994, assigned to the assignee of this invention, the disclosure of which is incorporated herein by reference.

The master cylinder 26 is operated by a conventional vehicle brake pedal 32 in response to the foot pressure applied by the vehicle operator.

While as illustrated in FIG. 1 the rear wheels are friction braked by electrohydraulic actuator 62, the rear wheels may alternatively be friction braked means of a pair of electrically operated brakes 34 and 36. Such brakes 34 and 36 may each take the form of an electrically operated drum brake in which the braking torque is established by operation of a dc torque motor at a value proportional to the torque output of the dc torque motor. One example of such a brake is illustrated in the U.S. Pat. No. 5,000,297, issued Mar. 19, 1991, assigned to the assignee of this invention.

In addition to the brake hydraulic brakes 34 and 36, the rear wheels are also braked regeneratively by the electric motor drive 65.

The front and rear brakes 18, 20, 34 and 36 and the electric motor drive 65 are operated to establish a desired braking condition by means of an electronic brake controller 38 and electronic motor controller 63. The electronic controllers 38, 63 each are microprocessor-based devices including random access and read-only memories and appropriate input/output interface circuitry to receive the input signals and provide the command outputs shown.

Construction of suitable controllers is within the level of one skilled in the art.

In general, the electronic brake controller 38 senses a braking command input by the vehicle operator by sensing the state of a conventional brake switch 40, which provides a signal when the vehicle operator applies pressure to the brake pedal 32. When the brake switch input is sensed, the electronic controller 38 operates the electromagnetic valves 28, 30 and 60 to close off the hydraulic communication between the master cylinder and the electrohydraulic actuators 22 and 24. This effectively isolates the wheel brakes 18, 20, 34 and 36 from the master cylinder 26 such that the hydraulic pressures at the wheel brakes are controlled solely by means of the electrohydraulic actuators 22, 24 and 62. The degree of braking effort commanded by the vehicle operator is sensed by means of a pedal position sensor 41 and a pressure sensor 42 monitoring operator depression of pedal 32 and the hydraulic pressure output of master cylinder 26, respectively. As is well known, the hydraulic pressure output of the master cylinder 26 is directly proportional to the applied pressure to the brake pedal 32 controlling the position of the master cylinder 26 and the position output of sensor 41.

Both the pedal position and the pedal pressure may be used to determine the operator requested brake effort command. In response to the brake effort command, the electronic controller 38 provides for establishing a desired brake torque at the front wheels 10 and 12 via the brakes 18 and 20 by commanding the motor current to each actuator 22, 24 to establish the actuator position, and therefore brake pressure, for each front brake 18, 20 at a desired level related to the brake effort command.

Also in response to the brake effort command, the electronic controller 38 receives, from motor controller 63, information concerning available and achieved regenerative braking of electric motor drive 65. Responsive to this information and the brake effort command, electronic controller 38 sends a regenerative braking command to motor controller 63, which commands the electric motor drive 65 to convert rotational motion of the rear wheels 14, 16 to electric energy that is transferred via power bus 66 from the electric motor drive 65 to the dc storage battery 68. In the event that the rear wheels do not achieve the desired brake torque solely through the regenerative braking, controller 38 establishes the remainder of the desired rear brake torque via brakes 34 and 36 by commanding motor current to actuator 62 to establish the actuator position, and therefore brake pressure, for each rear brake 34, 36 at the desired level. More particularly, the rear brakes 34 and 36 are commanded so that the sum of the friction brake torque and the electric motor regenerative brake torque equal the desired rear brake torque.

The actuator position feedback provided by the actuators 22, 24 and 68 is used in a standard commutation control to control the switching of the dc brushless motors and to provide closed-loop brake actuator position control. The position feedback may be used in accordance with the like control described in pending U.S. patent applications, Ser. No. 08/355,468, Ser. No. 08/513,191, and Ser. No. 08/513,192, assigned to the assignee of this invention.

Figure 2A:
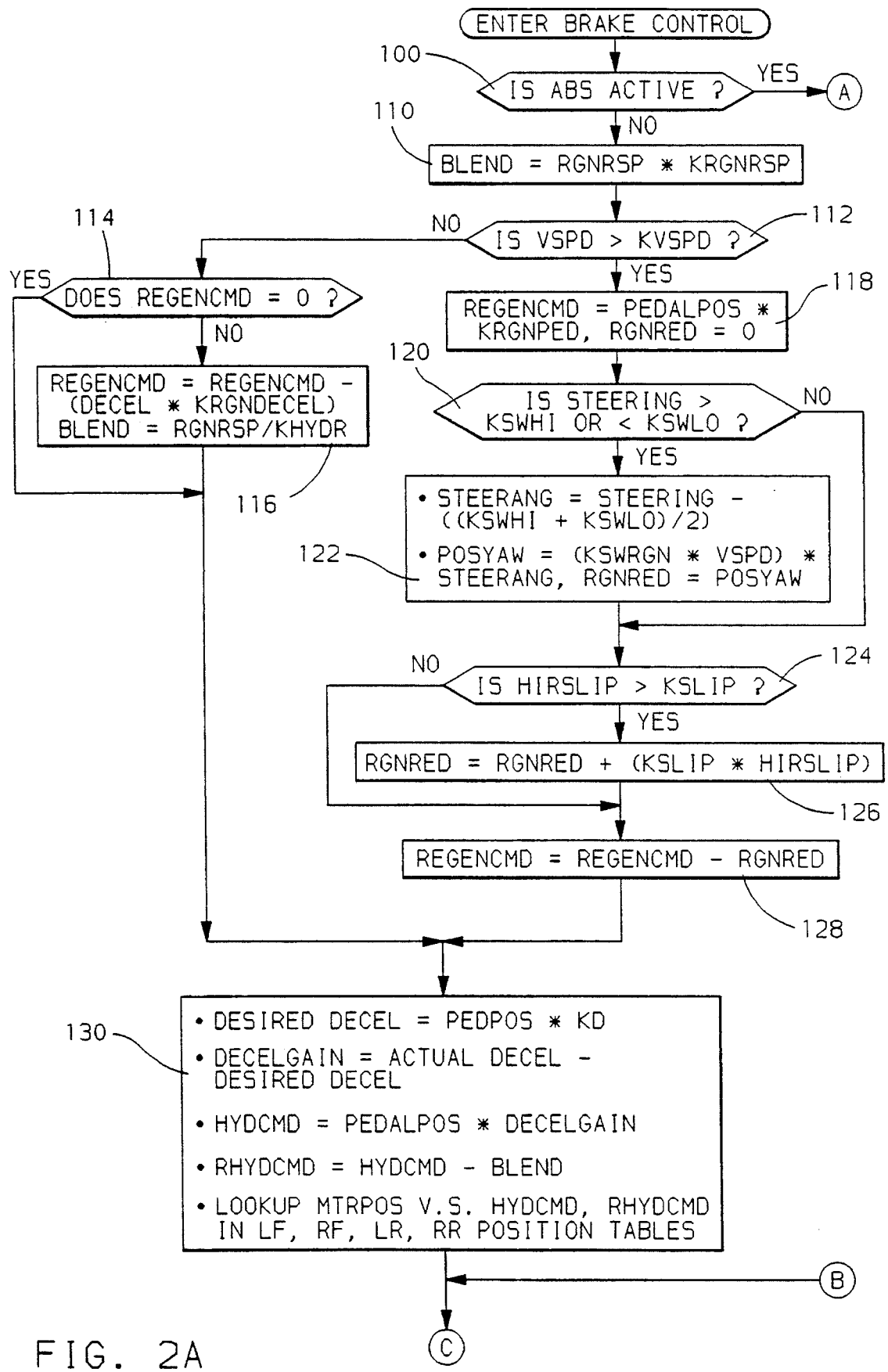
FIGS. 2a, 2b and 2c illustrate flow diagrams according to this invention.
Figure 2B:
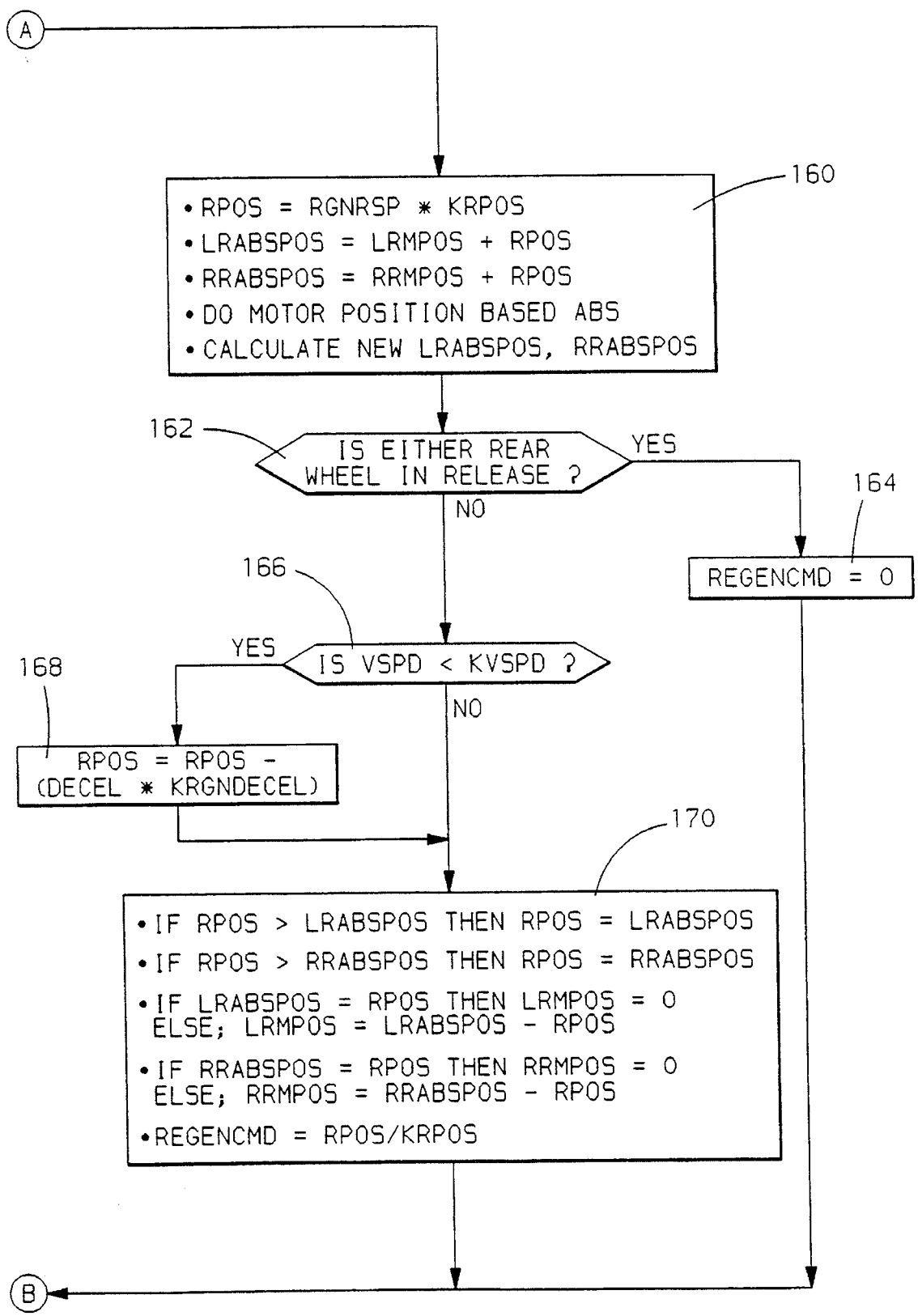
Figure 2C:
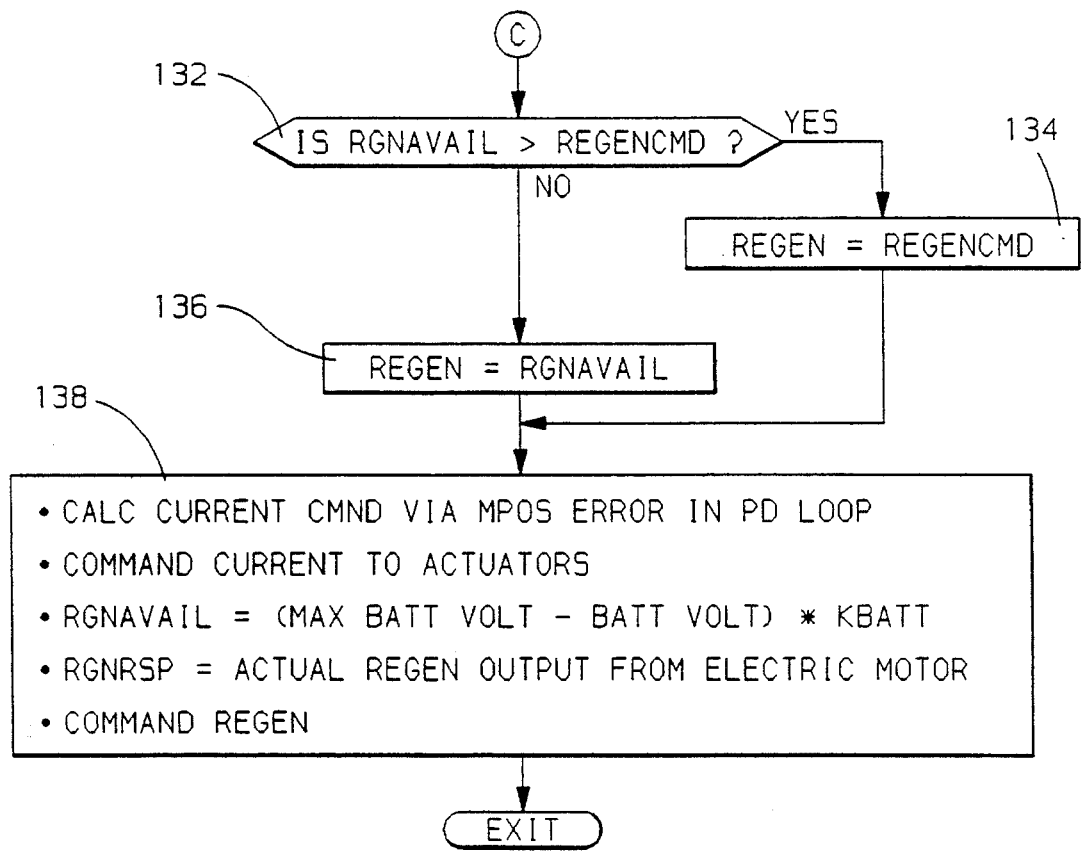

Referring now to FIGS. 2a–c, the brake control routine shown is entered when a vehicle operator depresses the brake pedal 32 (FIG. 1) and that depression is sensed by the brake pedal switch 40 (FIG. 1). The routine first checks, at block 100, whether the brake control is in ABS mode. In general, ABS mode occurs when the brake pedal is depressed and one or more of the vehicle wheels is in an incipient lock-up condition. This is typically determined in a manner well known to those skilled in the art when a rotational velocity of one or more of the vehicle wheels is slower than the vehicle wheel(s) with the fastest rotational velocity by more than a predetermined threshold. The difference in wheel rotational velocities is often referred to as "slip."

If ABS is active, the routine moves to block 160, described in detail further below. If ABS is not active, the routine moves to block 110 where it determines a position command, BLEND, responsive to the signal, RGNRSP, from the motor controller 63 indicating the amount of regenerative brake torque achieved. During the first control loop after the brake pedal has been depressed, RGNRSP is zero. BLEND is determined according to the equation:

$$BLEND = RGNRSP * KRGNRSP,$$

where KRGNRSP is a conversion constant.

In general, the value BLEND corresponds to the pedal position at which the pedal must be depressed to require friction braking in addition to regenerative braking. Thus, according to this invention, block 110 converts the regenerative braking achieved to a position value allowing interface between the regenerative braking and the position control of the friction brake actuators.

At block 112, the routine determines if the vehicle speed is greater than the threshold speed KVSPD. If the vehicle speed is not greater than the threshold speed, the routine moves to blocks 114 and 116 where the regenerative braking command, REGENCMD, is reduced to ensure smooth transition of the regenerative command to zero when the vehicle speed equals 0 m.p.h. This may be important in some systems to prevent adverse effects on a vehicle battery or electric motor when recharging is commanded but the vehicle is not moving. Block 114 compares REGENCMD to zero. If REGENCMD equals zero, the routine jumps ahead to block 130. If REGENCMD does not equal zero, REGENCMD is reduced according to the equation:

$$REGENCMD = REGENCMD - (DECEL * KRGNDECEL),$$

where KRGNDECEL is a predetermined constant and DECEL is the measured or computed actual vehicle deceleration. Block 116 sets the value BLEND according to:

$$BLEND = RGNRSP/KHYDR,$$

where KHYDR is a calibratable constant. KHYDR determines the rate that the hydraulic brake command ramps-up when the regenerative braking command is reduced to zero as the vehicle speed approaches zero. After block 116, the routine jumps ahead to block 130, described in detail further below.

Referring again to block 112, if the vehicle speed is greater than the threshold speed, KVSPD, the routine moves to block 118. At block 118, REGENCMD is determined responsive to the measured pedal position, PEDALPOS, multiplied by a conversion constant KRGNPED. Also at block 118, the regenerative braking reduction term is set equal to zero.

At blocks 120, 122 the routine determines whether the REGENCMD is to be reduced because of possible vehicle yaw. Block 120 compares the steering wheel angle to right and left turn thresholds KSWHI and KSWLO. If the steering wheel angle is between KSWHI and KSWLO, the routine jumps to block 124. If the steering wheel angle is not between KSWHI and KSWLO, the routine moves to block 122 where it determines a value STEERANG according to:

STEERANG=STEERING−((KSWHI+KSWLO)/2), where STEERING is the measured steering wheel angle. Block 122 then determines a possible vehicle yaw, POSYAW, according to:

POSYAW=VSPD*KSWRGN* STEERANG, where VSPD is measured vehicle speed and KSWRGN is a conversion constant. The regenerative braking reduction term RGNRED is then set equal to the value POSYAW.

At blocks 124 and 126, the routine determines if the regenerative brake torque reduction term is to be increased due to rear wheel slip. The value HIRSLIP is set equal to the highest measured slip of the two rear wheels. At block 124, the value HIRSLIP is compared to a threshold KSLIP. If HIRSLIP is not greater than KSLIP, the routine jumps to block 128. If, at block 124, the value HIRSLIP is greater than KSLIP, the routine moves to block 126 where the regenerative braking reduction term is increased according to:

RGNRED=RGNRED+(KSLIP*HIRSLIP).

The routine then moves to block 128 where REGENCMD is reduced by the regenerative braking reduction term according to:

REGENCMD=REGENCMD−RGNRED.

At block 130 the routine performs a series of calculations to determine the non-ABS braking motor position commands for the friction brake actuator motors. The ABS motor position commands are described further below. A value DESIREDDECEL, representative of the desired vehicle deceleration, is determined responsive to the measured pedal position multiplied by a predetermined gain constant KD. A value DECELGAIN, representative of the difference between DESIREDDECEL and the actual vehicle deceleration is determined according to:

DECELGAIN=DECEL−DESIREDDECEL.

A hydraulic brake command, HYDCMD, is determined responsive to the pedal position multiplied by DECELGAIN. The rear hydraulic brake command, RHYDCMD, is determined according to:

RHYDCMD=HYDCMD−BLEND.

The routine then looks up motor position commands for the front actuator motors responsive to HYDCMD and for the rear actuator motors responsive to RHYDCMD, vis-à-vis position look-up tables. This may be done in accordance with the teaching set forth in the above-mentioned pending applications Ser. No. 08/355,468, Ser. No. 08/513,191, and Ser. No. 08/513,192.

At block 132 the routine determines if the available regenerative braking is greater than the commanded regenerative braking. The available regenerative braking is determined responsive to motor speed and battery voltage in a manner well known to those skilled in the art. If the available regenerative braking is greater than the commanded regenerative braking at block 132, the routine moves to block 134 where the command REGEN is set equal to the commanded regenerative braking REGENCMD. If, at block 132, the available regenerative braking is not greater than the commanded regenerative braking, then the routine moves to block 136 where the command REGEN is set equal to the available regenerative braking.

From blocks 134 or 136, the routine moves to block 138 where the command REGEN is output to the electric motor controller to command regenerative braking and RGNRSP, indicating the amount of regenerative braking torque achieved, is received from the electric motor controller. A variety of methods are known to those skilled in the art for determining the amount of regenerative braking torque achieved. In one example, the motor controller monitors current generated by the motor or in a phase of the motor during regenerative braking. The measured generated current is then multiplied by a constant to determine regenerative braking torque achieved.

Also at block 138, a motor current command for each actuator is determined responsive to the position error for each actuator, which is the difference between the actual actuator position and the desired position determined at block 130 or at block 150. A proportional derivative control loop controls the actuator position in a manner such as described in the above-mentioned U.S. patent application Ser. No. 08/355,468 or as described in pending applications, Ser. No. 08/513,191, and Ser. No. 08/513,192. The available regenerative braking, RGNAVAIL, is updated according to the equation:

RGNAVAIL=(MAXBATTVOLT−BATTVOLT)*KBATT, where MAXBATTVOLT is the maximum allowable battery voltage, BATTVOLT is the measured battery voltage and KBATT is a conversion constant. After block 138, the brake control routine is exited for this loop of the control program and the routine is repeated in the next loop of the control program using the updated values of RGNRSP and RGNAVAIL.

In the event that, at block 100, the control routine is in ABS mode, the routine moves to block 160 where a series of calculations are performed. Block 160 determines a value representing the amount of actuator position equivalent to the amount of braking achieved by the regenerative braking, RPOS, by multiplying the total regenerative braking torque achieved, RGNRSP, by a position conversion constant, KRPOS. Also at block 160, the rear actuator position commands LRABSPOS and RRABSPOS are determined by summing the motor position command LRMPOS and RRMPOS, determined as described further below, with the position signal corresponding to regenerative braking achieved, RPOS. The commands LRABSPOS and RRABSPOS are then used to calculate new motor position commands LRABSPOS and RRABSPOS by using an ABS control algorithm of a type known to those skilled in the art and converting the resultant left and right brake commands to position commands and vice versa using conversion constants that can be easily determined for a specific vehicle system by one skilled in the art.

At block 162 the routine determines if either rear wheel is in the release mode. If so, the routine moves to block 164 where the REGEN command is set to zero. If, at block 162, neither of the rear wheels are in release mode, the routine moves to block 166 where it compares the vehicle speed with the vehicle speed threshold, KVSPD. If the vehicle speed is less than KVSPD, block 168 reduces the position corresponding to regenerative braking achieved by an amount equal to vehicle deceleration multiplied by the reduction constant, KRGNDECEL.

The routine then moves to block 170 where the values LRMPOS and RRMPOS are determined. If the value RPOS is greater than LRABSPOS, then block 170 sets RPOS equal to LRABSPOS. Similarly, if RPOS is greater than RRABSPOS, then RPOS is set equal to RRABSPOS. If the value LRABSPOS equals RPOS, then the value LRMPOS is set equal to zero. Otherwise, the value LRMPOS is set equal to the difference between LRABSPOS and RPOS. Similarly, if the value RRABSPOS is equal to RPOS then the value RRMPOS is set equal to zero. Otherwise, the value RRMPOS is set equal to the difference between RRABSPOS and RPOS. The motor position commands LRMPOS and RRMPOS are used at block 138 to control the electrohydraulic actuator motors. Block 170 determines the regenerative braking command, REGENCMD, according to:

REGENCMD= RPOS/KRPOS.

After block 170, the routine returns to block 132 in and continues in the manner described above to apply the regenerative braking and friction braking commands to the vehicle brakes.

The anti-lock braking control shown limits regenerative braking during anti-lock brake control by convening the regenerative torque achieved signal to a regenerative braking position signal (block 160). The regenerative braking position signal is then summed with the motor commands to determine the actual actuator position commands achieved by both the electrohydraulic actuators and the regenerative braking and those sums are used to determine the new actuator position commands (block 160). The control shown assumes that the vehicle includes two rear brake actuators, one for each rear wheel. If the vehicle has only one rear brake actuator, the minimum of the two rear commands may be used.

The regenerative braking position signal is then limited to no greater than the new actuator position commands (block 170) and is convened back to a regenerative braking command, which is used to command regenerative braking (output at block 138) within the constraints of the new actuator position commands. Similarly, the motor commands are determined to provide the difference in braking from that commanded by the new actuator position commands and that commanded by the regenerative braking command (block 170).

Through the above-described control, the amount of friction braking commanded is increased and/or decreased in response to available increases or decreases in regenerative braking to make maximum use of available regenerative braking. An advantage according to this invention is the blending of regenerative braking and the position control of the brake actuators. This advantage is achieved by converting the regenerative braking achieved to a position signal indicative of an amount of actuator position that it would take to achieve regenerative braking achieved. This position signal is then used with the position control according to this invention to modify the actuator position commands to effectively blend the friction and regenerative braking in an efficient manner, achieving efficient regenerative braking while maintaining, for the vehicle operator, a transparent "feel" of operation and consistent overall braking performance.

Figure 3:
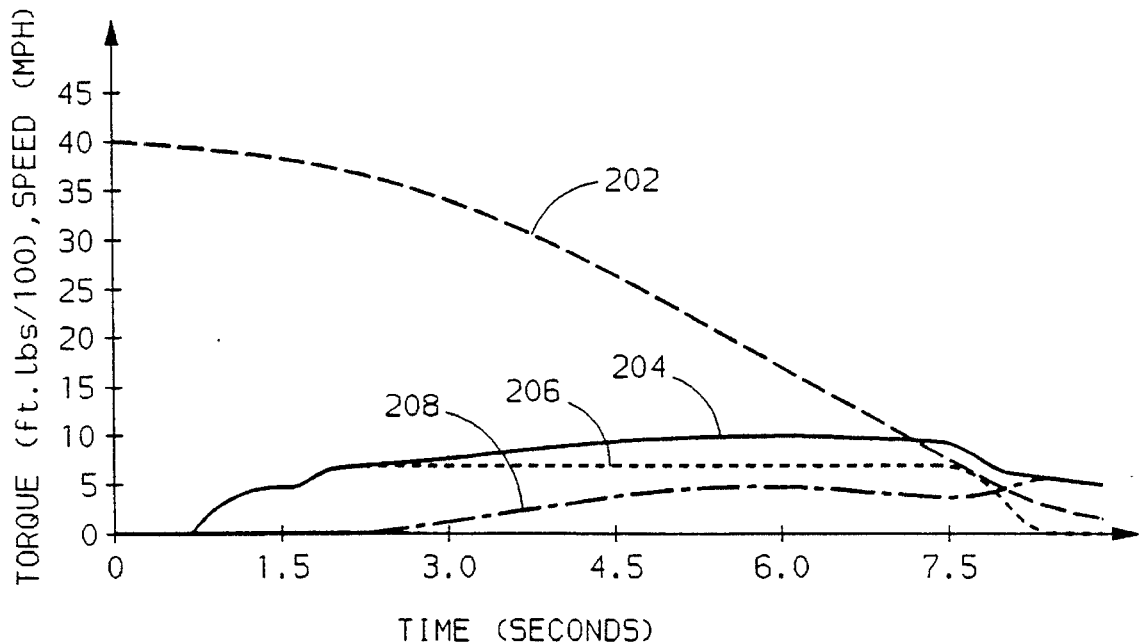
FIG. 3 is a graph illustrating the operation of this invention.

Referring now to FIG. 3, the graph shown illustrates the operation of this invention during a vehicle braking maneuver. Trace 202 illustrates that the vehicle is traveling at 40 m.p.h. at time $t_0$, just before the brakes are applied. The vehicle speed is reduced to zero at time $t_5$. At time $t_1$, after the brakes are applied, the regenerative braking torque 206 and the total vehicle braking torque 204 begin rising. Between times $t_1$ and $t_2$, the regenerative braking torque 206 and the total vehicle braking torque 204 are equal. After time $t_2$, the regenerative braking torque 206 can no longer match the required total vehicle braking torque 204 so the hydraulic brakes are applied, causing a rise in the hydraulic braking torque trace 208. After time $t_2$, the total braking torque 204 equals the sum of the regenerative braking torque 206 and the hydraulic braking torque 208.

After time $t_3$, the vehicle speed is lower than the threshold speed at which the regenerative braking command is ramped out. The effect of the ramp out of the regenerative braking command is shown by regenerative braking torque trace 206 between times $t_3$ and $t_4$. After time $t_3$, trace 208 illustrates the ramp up of the hydraulic braking torque to the point where, after time $t_4$, when the regenerative braking torque 206 equals zero, the hydraulic braking torque 208 provides the total vehicle braking torque 204.

We claim:

1. A regenerative and friction brake blend control method for use in a vehicle with at least one positionable hydraulic brake actuator for achieving friction braking and an electric propulsion motor with regenerative braking capability wherein an amount of regenerative braking achieved is indicated by a signal, wherein the method comprises the steps of:

determining a hydraulic actuator position command indicating a desired vehicle braking;

determining, responsive the hydraulic actuator position command, a regenerative braking command;

commanding the electric propulsion motor to regeneratively brake the vehicle responsive to the regenerative braking command;

receiving the signal indicative of regenerative braking achieved;

converting the signal indicative of regenerative braking achieved to an actuator position reduction signal;

subtracting the actuator position reduction signal from the hydraulic actuator position command to determine a difference command; and commanding the brake actuator according to the difference command, wherein the brake actuator and the regenerative braking together achieve the desired vehicle braking.

2. A regenerative and friction brake blend control method according to claim 1, wherein the vehicle further includes an anti-lock brake system that determines an anti-lock brake command, further comprising the steps of:

determining if an anti-lock brake control is active; if the anti-lock brake control is active, then converting the anti-lock brake command to an ABS position command;

converting the signal indicative of regenerative braking achieved into a regenerative braking motor position command;

limiting the regenerative braking motor position command to no greater than the ABS position command;

determining an actuator position command equal to a difference between the ABS position command and the regenerative braking motor position command;

commanding the brake actuator responsive to the actuator position command; and determining the regenerative braking command responsive to the limited regenerative braking motor position command, wherein, during ABS, both regenerative and friction braking are blended in a position-based control and wherein, during ABS, regenerative braking torque is restricted to a value corresponding to the ABS position command.

\* \* \* \* \*